United States Patent
Yi

(10) Patent No.: US 7,337,769 B2
(45) Date of Patent: *Mar. 4, 2008

(54) CHARGE AIR COOLER HAVING REFRIGERANT COILS AND METHOD FOR COOLING CHARGE AIR

(76) Inventor: Joon Tae Yi, 3 Leslie Ann Ct., Denville, NJ (US) 07834

( * ) Notice: Subject to any disclaimer, the term of this patent is extended or adjusted under 35 U.S.C. 154(b) by 0 days.

This patent is subject to a terminal disclaimer.

(21) Appl. No.: 11/507,054

(22) Filed: Aug. 21, 2006

(65) Prior Publication Data

US 2006/0278203 A1    Dec. 14, 2006

Related U.S. Application Data

(63) Continuation of application No. 11/253,165, filed on Oct. 18, 2005.

(60) Provisional application No. 60/620,166, filed on Oct. 19, 2004.

(51) Int. Cl.
F02B 29/04 (2006.01)
F02B 33/00 (2006.01)
F28D 7/02 (2006.01)
F28D 7/10 (2006.01)
F28D 1/00 (2006.01)

(52) U.S. Cl. .......... 123/563; 60/599; 165/150; 165/163; 165/140; 165/151; 165/171; 165/41; 165/51

(58) Field of Classification Search .......... 60/599; 123/563; 165/140 X, 51 X, 150 X, 163 X, 165/41, 151, 171
See application file for complete search history.

(56) References Cited

U.S. PATENT DOCUMENTS

| | | | | |
|---|---|---|---|---|
| 2,006,649 | A * | 7/1935 | Modine | 165/151 |
| 2,211,335 | A * | 8/1940 | Lindermann | 165/163 |
| 2,959,029 | A * | 11/1960 | Best | 62/209 |
| 4,176,630 | A | 12/1979 | Elmer | 123/41.12 |
| 4,317,439 | A | 3/1982 | Emmerling | 123/563 |
| 4,390,776 | A * | 6/1983 | Yane et al. | 219/523 |
| 4,480,439 | A | 11/1984 | Yamane | 60/599 |
| 4,683,725 | A | 8/1987 | Sugiura | 62/199 |
| 4,688,383 | A * | 8/1987 | Targa Pascual | 123/563 |
| 5,353,868 | A * | 10/1994 | Abbott | 165/171 |
| 5,520,015 | A * | 5/1996 | Lukas et al. | 165/140 |
| 5,875,837 | A * | 3/1999 | Hughes | 165/140 |

(Continued)

FOREIGN PATENT DOCUMENTS

DE    10254016 A1 *  6/2004

(Continued)

Primary Examiner—Thai-Ba Trieu
(74) Attorney, Agent, or Firm—Leonard B. Taylor

(57) ABSTRACT

An apparatus and a method for cooling charge air, comprising the steps of introducing a cooling agent into at least one cooling agent conduit whereby the at least one cooling agent conduit is cooled (Step 401), flowing thermally charged air through a plurality of charge air conduits positioned in proximity to the at least one cooling agent conduit (Step 402), directing ambient air to contact the cooled at least one cooling agent conduit whereby the ambient air is cooled (Step 403), and directing the cooled ambient air to contact the plurality of charge air conduits whereby the plurality of charge air cooler conduits are cooled further cooling the thermally charged air present within (Step 404).

18 Claims, 4 Drawing Sheets

U.S. PATENT DOCUMENTS

| | | | |
|---|---|---|---|
| 6,006,540 A | 12/1999 | Coletti | 123/563 |
| 6,394,076 B1 | 5/2002 | Hudelson | 123/563 |
| 6,619,379 B1 | 9/2003 | Ambros et al. | 165/41 |
| 6,748,934 B2 | 6/2004 | Natkin et al. | 123/563 |
| 6,779,515 B2 | 8/2004 | Vaught et al. | 123/563 |
| 6,796,134 B1 | 9/2004 | Bucknell et al. | 123/563 |
| 6,883,314 B2 | 4/2005 | Callas et al. | 123/563 |
| 6,910,345 B2 * | 6/2005 | Horstmann et al. | 62/238.6 |
| 6,957,689 B2 | 10/2005 | Ambros et al. | 123/563 |
| 2006/0096286 A1 * | 5/2006 | Agee et al. | 60/599 |

FOREIGN PATENT DOCUMENTS

| | | | |
|---|---|---|---|
| JP | 60132027 A | * | 7/1985 |
| JP | 61065014 A | * | 4/1986 |
| JP | 63075312 A | * | 4/1988 |
| JP | 09126668 A | * | 5/1997 |
| JP | 09317480 A | * | 12/1997 |
| SU | 1321860 A1 | * | 7/1987 |

* cited by examiner

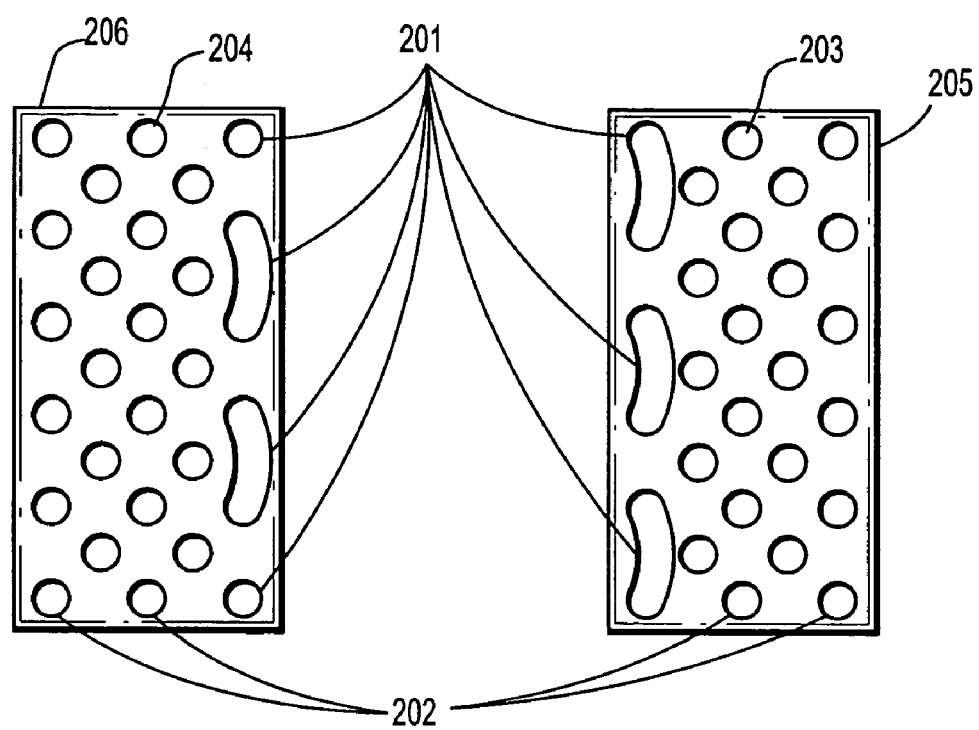
FIG. 2A  FIG. 2B
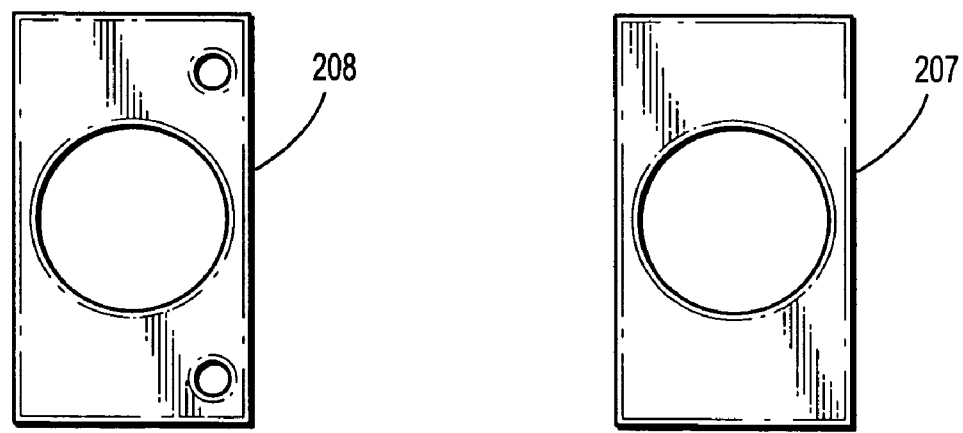
FIG. 2C  FIG. 2D

CHARGE AIR COOLER HAVING REFRIGERANT COILS AND METHOD FOR COOLING CHARGE AIR

This application is a continuation of U.S. Non-Provisional application Ser. No. 11/253,165 filed Oct. 18, 2005 and claims the benefit of U.S. Provisional Application 60/620,166 filed Oct. 19, 2004.

BACKGROUND OF THE INVENTION

1. Field of the Invention

The present invention generally relates an intercooler for manifold intake air. More particularly compressed charge air from a turbocharged or supercharged engine flows through charge air cooling conduits that are cooled by an ambient air stream that has been cooled by passing around and contacting a refrigerant conduit prior to passing around and contacting the charge air cooling conduits.

2. Discussion of Related Art

Methods of increasing the air or air/fuel mixture density of an engine by increasing the pressure of the intake air stream prior to its entering the engine cylinder can be referred to as "turbocharging" and "supercharging". A relatively simple and advantageous method of increasing the power generated by the engine is to increase the density of air in the cylinder. Supercharging generally means that the air intake compressor is powered by coupling it to the engine via a belt, chain, etc. Turbocharging commonly means that the engine exhaust stream powers the air intake compressor. Turbocharging is favored over supercharging because current designs are more efficient at harvesting the energy in the exhaust stream. This increased efficiency means that without a significant decrease in fuel economy, turbocharging permits an increase in the engine power output. Charged air means air that is compressed by either a turbocharger or a supercharger.

Since pressure is directly related to heat, as the charger increases the pressure of the intake air stream the charger also increases the intake air stream temperature. Cooler air can be more densely packed so by cooling the intake air stream an additional increase in the intake air stream pressure is further permitted. This additional cooling is generally accomplished through the use of an intercooler.

A basic intercooler would comprise incorporating a heat exchanger into the air stream between the charger and the engine intake manifold. Such a heat exchanger can utilize fins, coils, or a combination thereof to increase the rate at which heat is absorbed and re-radiated into the ambient environment. Even if the placement of the heat exchanger is optimized the ambient air temperature as well as the temperature at the air intake point are uncontrollable variables.

Prior art in this field illustrates intercoolers that are located in the intake air stream between the charger and the combustion chamber where the intercooler contains a heat exchanger that is cooled by the vehicle's air conditioning system. Although this design permits reasonably uniform cooling of the intake air stream, the need for maximum cooling of the intake air stream and the passenger compartment are most likely to occur simultaneously. This has the effect of significantly reducing engine efficiency and erasing power gains from a charger/engine combination. Additionally, failure of the air conditioning system, charger, or engine can result.

From the inception of the age of manufactured motor vehicles, motor vehicles have been increasing in intricacy. With each successive model year the number of features that contribute to vehicle performance, vehicle safety, and operator comfort increases. Features that were once optional are increasingly becoming standard features. Following this trend is a reduction in the amount of space in the engine compartment.

An intercooler is a simple and relatively inexpensive component when compared to a turbocharger or supercharger. Accordingly, using an intercooler would generally be easy to justify because its addition to the operating efficiency of a charger is greater than its size, weight, operation, and expense. Although basic intercoolers appear on many turbocharged vehicles, improved intercoolers have not been utilized for production vehicles. This is due to the fact that the intercooler's size, weight, operation, and expense as compared to using a basic intercooler or no intercooler at all outweigh any improvement to vehicle performance. Thus a need exists for a charge air cooler that is compact and functional no matter where it is mounted in the engine compartment. A further need exists for an improved charge air cooler design that is inexpensive and small, yet still capable of increasing the efficiency of a charger.

SUMMARY OF THE INVENTION

An object of the present invention is to provide an inexpensive efficient solution to the problem of cooling compressed charged air that emanates from a compression device, such as turbocharger or supercharger.

Another object of the present invention is an intercooler adaptable to a variety of engine sizes and configurations that is capable of efficiently cooling the air intake from a compression device.

Another object of the invention is to construct an inexpensive efficient intercooler by modifying such as by cutting and splicing, refrigerant coils that are commonly found within air conditioning units or similar devices, the modified coils being adapted to be utilized as charge air conduits and cooling agent conduits within the intercooler.

A further object of the invention is a method of cooling compressed thermally densified air emanating from a compression device including the steps of directing the compressed, thermally densified air into charge air conduits, cooling an ambient air stream by directing the air stream around while contacting at least one cooling agent conduit, directing the cooled ambient air stream around and contacting the charge air conduits, and directing the cooled charge air to a receiving combustion device, such as an engine.

BRIEF DESCRIPTION OF THE DRAWINGS

Preferred embodiments of the present invention will be described below in more detail, with reference to the accompanying drawings:

FIGS. 2a, 2b, 2c, and 2d are schematic side view representations of a charge air cooler according to an embodiment of the present invention;

DETAILED DESCRIPTION

According to an embodiment of the present invention, a charge air cooler and method for cooling manifold intake air that emanates from a turbocharged or supercharged engine, by directing the flow of charge air through charge air conduits that are cooled by an ambient air stream that has been dynamically cooled by passing around and contacting at least one refrigerant conduit prior to being directed around and contacting the charge air conduits.

Figure 1:
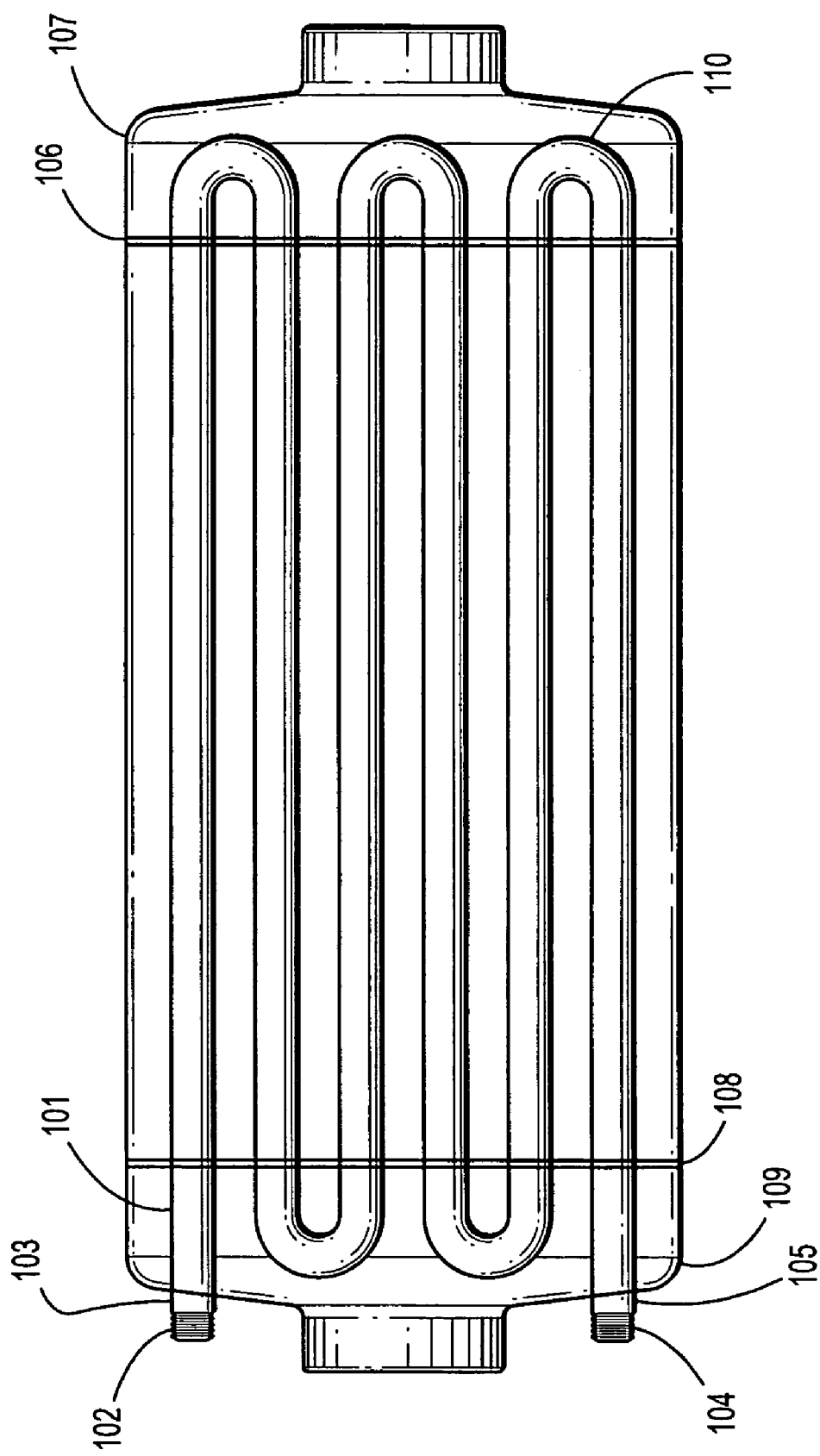
FIG. 1 is a schematic front view representation of a charge air cooler according to an embodiment of the present invention.

Referring to FIG. 1 which illustrates a schematic front view of a construction of a charge air cooler according to an embodiment of the present invention, at least one cooling agent conduit 101 such as a tube or modified refrigeration coil, having an supply connector 102 on a supply end 103 and a return connector 104 on a return end 105 is mounted laterally between an intake housing support member 106 positioned within an intake housing 107, and an exhaust housing support member 108 positioned within an exhaust housing 109. In a preferred embodiment according to the present invention, the at least one cooling agent conduit is thermally conductive. Thermally conductive means that it is capable of at least one of heat transfer and cold transfer. In a preferred embodiment according to the present invention, the supply end 103 of the at least one cooling agent conduit extends through a top side of the exhaust housing 109, the return end 105 of the at least one cooling agent conduit continues laterally in a direction opposite to said supply end 103 through the top side of the exhaust housing support member 108 extending laterally across the front of the air charge cooler to a top side of the intake housing support member, passing through the intake housing support member forming a semi-circular bend 110 within the intake housing 107, again passing through the intake housing support member 106 continuing laterally to the exhaust housing support member 108 passing through the exhaust housing support member 108 forming a semi-circular bend within the exhaust housing 109 and again passing through the exhaust housing support 108 member. When an optimum number of coils of the at least one cooling agent conduit have been configured said return end 105 of the at least one cooling agent conduit 101 exits through the exhaust housing support member 108 continuing through a bottom side of the exhaust housing 109 opposite from where the supply end 103 of the at least one cooling agent conduit 101 exits the exhaust housing 109. According to another embodiment of the present invention the at least one cooling agent conduit does not have to be coiled but can be constructed for example as a straight line, multiple straight lines, and grids, however other cooling agent conduit formations can be used.

Referring to FIGS. 2a, 2b, 2c, and 2d which illustrate schematic side views of a construction of a charge air cooler according to an embodiment of the present invention, positioned in proximity to the at least one cooling agent conduit 201 are a plurality of charge air conduits 202 for example tubes, having an open intake end 203 and an open exhaust end 204. In an embodiment according to the present invention, the plurality of charge air conduits is thermally conductive. The plurality of charge air conduits 202 are mounted laterally between the intake support member 205 and the exhaust support member 206 with the open intake end 203 and the open exhaust end 204 being exposed to an inside of the intake housing and the exhaust housing respectively. The plurality of charge air conduits 202 are positioned adjacent to the at least one cooling agent conduit 201. In another embodiment of the present invention the cooling agent conduit can be intertwined and interspersed among the charge air conduits. In yet another embodiment of the present invention a plurality of cooling agent conduits can be utilized and the plurality of cooling agent conduits can be intertwined and interspersed among the charge air conduits. Intake housing 207 is fixed onto intake support member 205 and exhaust housing 208 is fixed onto exhaust housing support member 206. Charge air flows into intake housing 207 through the plurality of charge air conduits 202 and exits from the exhaust housing 208.

Figure 3:
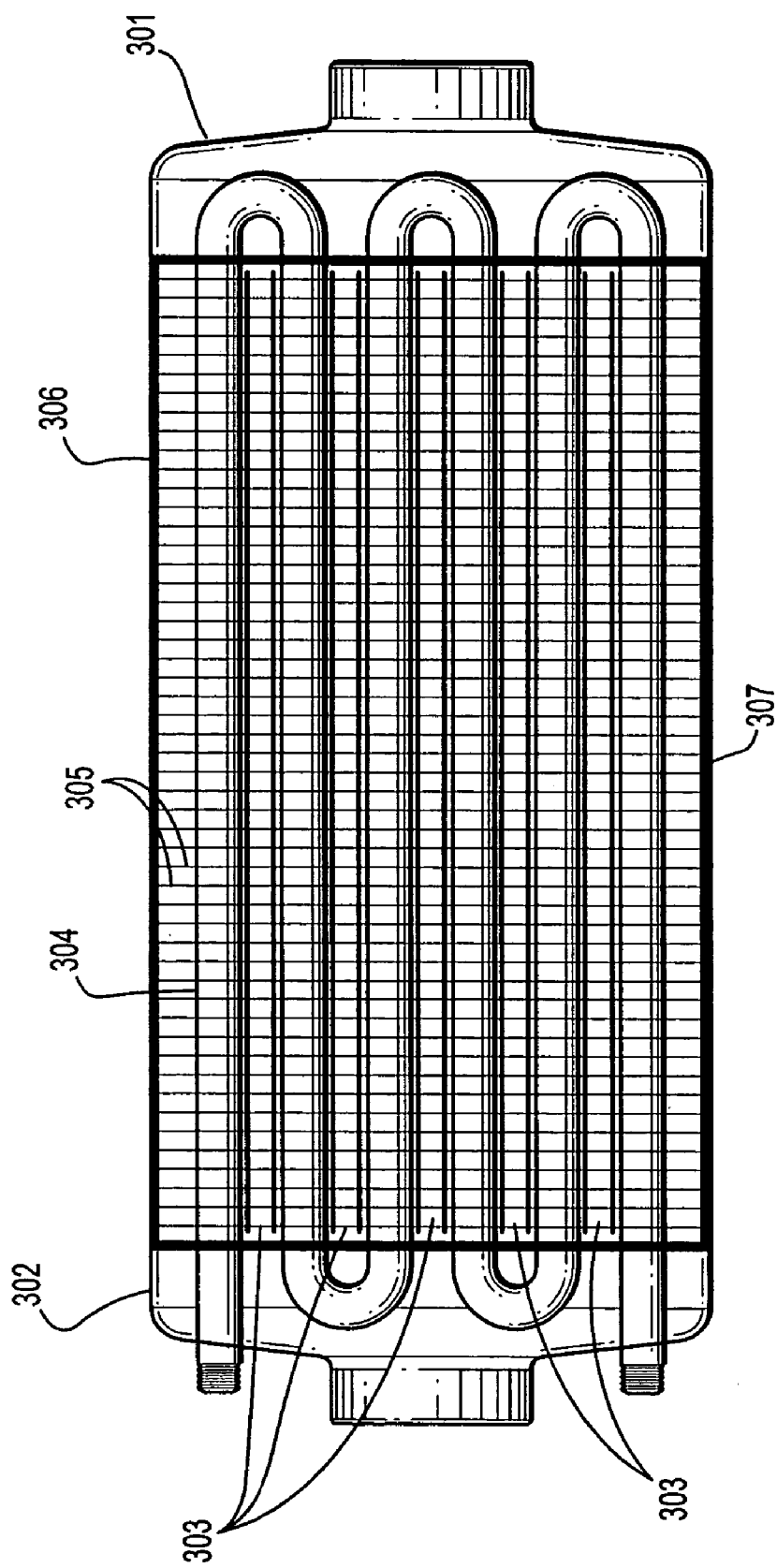
FIG. 3 is a schematic front view representation of a charge air cooler according to an embodiment of the present invention.

Referring to FIG. 3 which illustrates a schematic front view of a construction of a charge air cooler according to an embodiment of the present invention, positioned between the intake housing 301 and the exhaust housing 302 and longitudinal to the plurality of charge air conduits 303 and at least one air cooling conduit 304 are a plurality of airflow fins 305. In an embodiment according to the present invention, the plurality of airflow fins is thermally conductive. The plurality of airflow fins 305 are spaced apart at a distance to optimally direct ambient airflow to enter a front side of the charge air cooler, further directing the ambient airflow to contact the at least one cooling agent conduit, further directing the ambient airflow to contact the plurality of charge air conduits, and further directing the ambient air flow to exit a backside of the charge air cooler. The airflow fins can be constructed whereby the plurality of airflow fins extend from the front side of the charge air cooler to the backside of the charge air cooler, however other airflow fin configurations can be used. In another embodiment of the present invention the airflow fins can be replaced with another airflow direction device such as a conduit.

In a preferred embodiment according to the present invention a first protective shroud member 306 envelopes a top portion of the cooling fins extends laterally from the intake housing 301 to the exhaust housing 302 prevents damage to the top portion of the plurality of airflow fins, and a second protective shroud member 307 envelopes a bottom portion of the airflow fins extends laterally from the intake housing 301 to the exhaust housing 302 prevents damage to the bottom portion of the plurality of airflow fins. However, either or both protective shrouds can be omitted.

The supply connector and the return connector of the at least one cooling conduit are connected to a refrigerant system such as an air conditioning system of an automobile, however a refrigerant system independent of an air conditioner system can also be used. Additionally according to an embodiment of the present invention the refrigerant system can also be made a part of the charge air cooler itself whereby the charge air cooler is completely self-contained.

The intake housing neck can be connected directly to a compressed charge air source however the intake housing neck can also be indirectly connected to a compressed charge air source. The exhaust housing neck is connected directly to an air intake of combustion equipment for example an engine and motor, however the exhaust housing neck can also be indirectly connected to the air intake of combustion equipment.

During operation of the charge air cooler, refrigerant flows from the refrigerant system into the supply end of the at least one cooling agent conduit to the return end of the at least one cooling agent conduit returning to the refrigerant system. Compressed charge air from the compressed charge air source, flows into the intake housing, into the intake ends of the plurality of charge air conduits, through the plurality of charge air conduits exiting through the exhaust end of the charge air conduits into the exhaust housing, and then exits the charge air cooler.

When a charge air cooler according to the present invention is positioned in front of a vehicle and the vehicle begins to move in a forward motion, ambient air circulates by flowing into the front side of the charge air cooler in between the airflow fins, contacting the at least one cooling agent conduit whereby the ambient airflow is cooled. The cooled ambient airflow further circulates to contact and cool the plurality of charge air conduits whereby the charge air present within is advantageously cooled. The cooled ambient air then exits through the backside of the charge air cooler. The airflow fins can be constructed from materials that further aid the thermal exchange between the ambient airflow and at least one cooling agent conduit, and further aid thermal exchange between the cooled ambient airflow and the plurality of charge air conduits, by positioning the airflow fins to be in direct contact with the at least one cooling agent conduit and the plurality of charge air conduits. According to another embodiment of the present invention, ambient air can be introduced into the air charge cooler by use of an air-circulating device, for example a fan.

Figure 4:
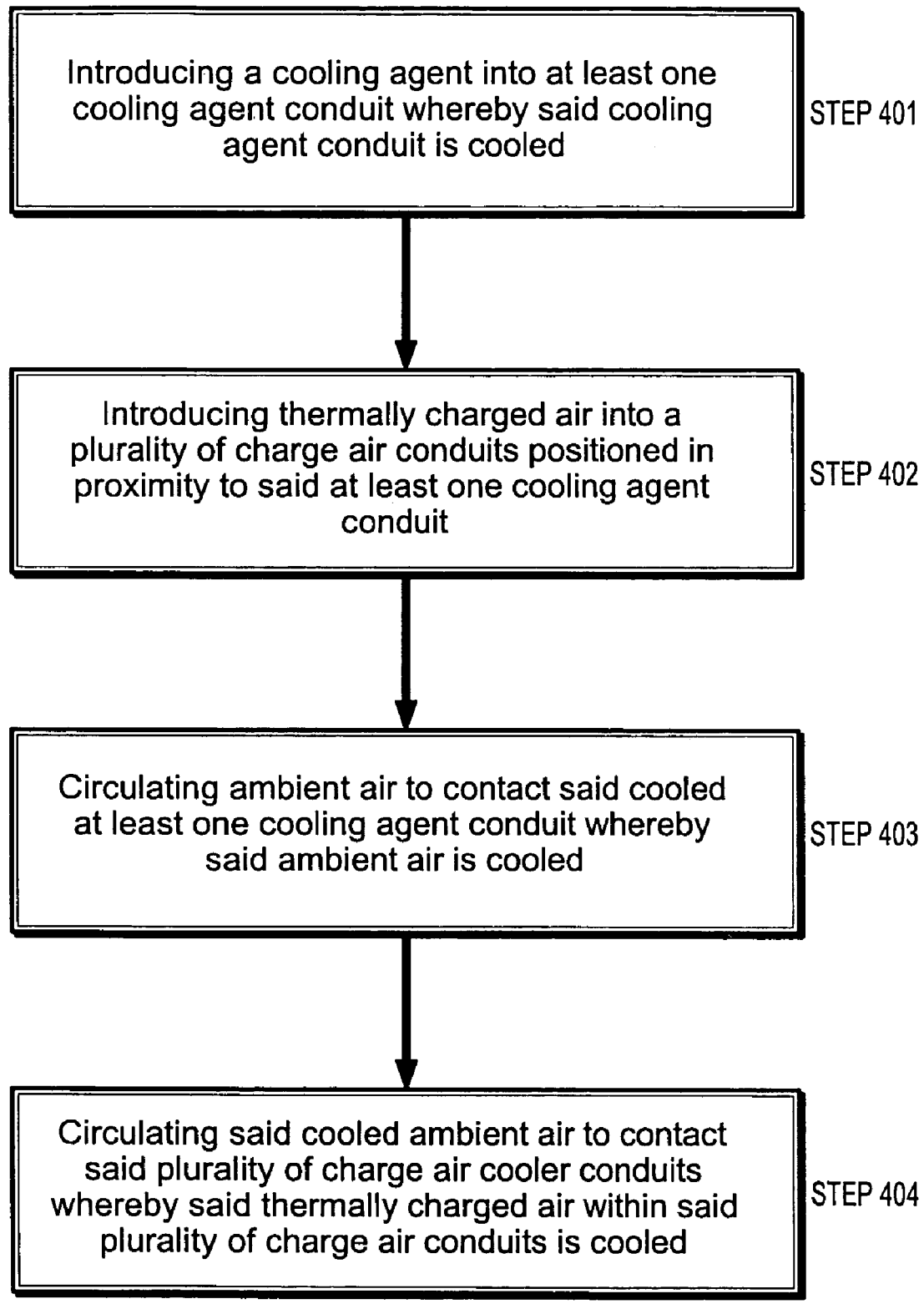
FIG. 4 is a flow chart of a method for cooling charge air according to an embodiment of the present invention.

Referring to FIG. 4 which illustrates a block diagram of a method for cooling charge air according to an embodiment of the present invention. A cooling agent is introduced into at least one cooling agent conduit whereby said at least one cooling agent conduit is cooled (Step 401). Thermally charged air is introduced into a plurality of charge air conduits positioned in proximity to said at least one cooling agent conduit (Step 402). Ambient air is circulated to contact said cooled at least one cooling agent conduit whereby said ambient air is cooled (Step 403). The cooled ambient air is circulated to contact said plurality of charge air conduits whereby said plurality of charge air cooler conduits are cooled further cooling said thermally charged air present within (Step 404).

Having described embodiments for an apparatus and a method for cooling charge air, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A method for cooling charge air within a charge air apparatus having a housing, an intake housing for receiving thermally charged air, an exhaust housing for exhausting cooled said thermally charged air, and a plurality of charge air conduits being mounted laterally and in proximity to at least one cooling agent conduit within said housing, the method comprising the steps of:
    introducing a cooling agent into said at least one cooling agent conduit whereby said at least one cooling agent conduit is cooled,
    flowing thermally charged air through said plurality of charge air conduits positioned in proximity to said at least one cooling agent conduit,
    directing ambient air with a plurality of airflow fins positioned in contact with said at least one cooling agent conduit and said plurality of charge air conduits, such that said ambient air is directed to contact said cooled at least one cooling agent conduit whereby said ambient air is cooled, and
    directing said cooled ambient air to contact said plurality of charge air conduits whereby said plurality of charge air cooler conduits are cooled further cooling said thermally charged air present within said housing.

2. The method of claim 1, wherein said cooling agent includes a refrigerant.

3. The method of claim 1, wherein said step of introducing a cooling agent includes introducing a cooling agent from at least one of a refrigerant system independent of an automotive air conditioning system, an automotive air conditioning system, and a self-contained air conditioning system.

4. The method of claim 1, wherein said plurality of airflow fins provide at least one of heat transfer and cold transfer.

5. The method of claim 1, wherein said plurality of airflow fins are thermally conductive.

6. The method of claim 1, wherein at least one of said at least one cooling agent conduit and said plurality of charge air conduits are thermally conductive.

7. The method of claim 1, wherein the step of directing ambient air includes directing ambient air with at least one of vehicular movement and an air circulation device.

8. The method of claim 7, wherein said circulation device includes at least one of a fan, compressed air.

9. The method of claim 1, further comprising the step of flowing said cooled thermally charge air into a combustion device.

10. The method of claim 9, wherein said combustion device includes at least one of an automobile engine, an airplane engine, a motorcycle engine, a boat engine, a ship engine, a rocket, a turbine, a manufacturing engine.

11. The method of claim 1, further comprising the step of modifying a refrigeration coil unit to construct at least one of said at least one cooling agent conduit and said plurality of charge air conduits.

12. The method of claim 11, wherein said refrigeration coil includes at least one of a new refrigeration coil unit, a remanufactured refrigeration coil unit, a refrigerator refrigeration coil unit, an air conditioner refrigerator coil unit, a used refrigerator coil unit.

13. The method of claim 11, wherein said step of modifying a refrigeration coil unit further includes cutting and splicing coils within said refrigeration coil unit to form said at least one cooling agent conduit and said plurality of charge air conduits.

14. A charge air apparatus for cooling charge air comprising:
    an intake housing for receiving thermally charged air,
    an exhaust housing for exhausting cooled said thermally charged air,
    at least one cooling agent conduit having a supply end and a return end for connection to a refrigerant system, said at least one cooling agent conduit being mounted laterally between said intake housing and said exhaust housing,
    a plurality of charge air conduits for cooling said thermally charged air, each having an intake end and an exhaust end, said intake end of each of said plurality of charge air conduits being mounted to said intake housing and said exhaust end of each of said plurality of charge air conduits being mounted to said exhaust housing, said plurality of charge air conduits further being mounted laterally and in proximity to said at least one cooling agent conduit, and
    a plurality of airflow fins spaced apart and directing ambient air flow, each of said plurality of airflow fins having a first end and a second end,
        wherein said plurality of airflow fins contact said at least one cooling agent conduit and said plurality of charge air conduits;
        wherein said plurality of airflow fins are longitudinally spaced along said at least one refrigerant conduit and said plurality of charge air conduits and positioned in between said intake housing and said exhaust housing;

wherein said at least one refrigerant conduit cools said ambient air flowing through said plurality of airflow fins, and wherein said plurality of charge air conduits are cooled by said cooled ambient air flow.

15. The charge air apparatus of claim 14, wherein said refrigerant system includes at least one of a refrigerant system independent of an automotive air conditioning system, an automotive air conditioning system, and a self-contained air conditioning system.

16. The charge air apparatus of claim 14, wherein at least one of said at least one refrigerant conduit and said plurality of charge air conduits are thermally conductive.

17. The charge air apparatus of claim 14, wherein said plurality of airflow fins provide at least one of heat transfer and cold transfer.

18. The charge air apparatus of claim 14, further comprising a first protective shroud and a second protective shroud for protecting said plurality of airflow fins from damage, said first protective shroud encompassing said first end of each of said plurality of airflow fins and being positioned laterally and affixed to and in between said intake housing and said exhaust housing, and said second protective shroud encompassing said second end of each of said plurality of airflow fins being positioned laterally and affixed to and in between said intake housing and said exhaust housing.

* * * * *